(12) United States Patent
Tsai et al.

(10) Patent No.: US 11,143,914 B2
(45) Date of Patent: Oct. 12, 2021

(54) MULTILAYER OF LIGHT DIFFUSERS, BACKLIGHT UNIT, AND LIQUID CRYSTAL DISPLAY DEVICE

(71) Applicant: KEIWA Inc., Tokyo (JP)

(72) Inventors: Chengheng Tsai, Taipei (TW);
Masayuki Sukigara, Tokyo (JP);
Motohiko Okabe, Tokyo (JP);
Takahiro Tsuji, Tokyo (JP)

(73) Assignee: KEIWA INC., Tokyo (JP)

( * ) Notice: Subject to any disclaimer, the term of this patent is extended or adjusted under 35 U.S.C. 154(b) by 0 days.

(21) Appl. No.: 16/698,259

(22) Filed: Nov. 27, 2019

(65) Prior Publication Data
US 2020/0292881 A1    Sep. 17, 2020

(30) Foreign Application Priority Data

Mar. 13, 2019   (JP) .............................. JP2019-045609

(51) Int. Cl.
*G02F 1/13357*   (2006.01)
*G02B 5/02*   (2006.01)
*G02F 1/1335*   (2006.01)

(52) U.S. Cl.
CPC ..... *G02F 1/133606* (2013.01); *G02B 5/0278* (2013.01); *G02F 1/133607* (2021.01)

(58) Field of Classification Search
CPC ... G02F 1/133606; G02F 2001/133607; G02B 5/0278
See application file for complete search history.

(56) References Cited

U.S. PATENT DOCUMENTS

| | | | |
|---|---|---|---|
| 6,417,831 B2 | 7/2002 | Kashima | |
| 7,802,895 B2 | 9/2010 | Suzuki et al. | |
| 8,167,473 B2 | 5/2012 | Ahn | |
| 2004/0232853 A1* | 11/2004 | Hur | H05B 41/00 315/291 |
| 2009/0059120 A1* | 3/2009 | Hoshi | G02F 1/133606 349/62 |
| 2009/0091919 A1 | 4/2009 | Goto | |
| 2009/0268430 A1* | 10/2009 | Suzuki | G02B 5/0242 362/97.1 |
| 2010/0033957 A1* | 2/2010 | Lin | G02B 5/0278 362/97.2 |

(Continued)

FOREIGN PATENT DOCUMENTS

| | | |
|---|---|---|
| CN | 102472843 A | 5/2012 |
| CN | 102597819 A | 7/2012 |

(Continued)

OTHER PUBLICATIONS

European Partial Search Report for the Application No. 19207958.0 dated May 13, 2020 in 11 pages.

(Continued)

*Primary Examiner* — Evan P Dzierzynski
(74) *Attorney, Agent, or Firm* — Knobbe, Martens, Olson & Bear LLP (57) ABSTRACT

A multilayer of light diffusers includes the light diffusers layered one on top of another, and an air layer between adjacent light diffusers. Each of the light diffusers contains a light diffusing agent in a resin matrix. An example of the resin matrix is an aromatic polycarbonate, and an example of the light diffusing agent is a silicone-based diffusing agent.

9 Claims, 5 Drawing Sheets

(56) References Cited

U.S. PATENT DOCUMENTS

| | | | |
|---|---|---|---|
| 2010/0066946 A1 | 3/2010 | Song et al. | |
| 2010/0328579 A1 | 12/2010 | Shim et al. | |
| 2012/0176772 A1* | 7/2012 | Maekawa | G02B 5/0231 362/97.1 |
| 2014/0036536 A1* | 2/2014 | Gettemy | G02B 26/02 362/612 |
| 2014/0357809 A1* | 12/2014 | Miyake | C08L 83/10 525/461 |
| 2018/0364411 A1 | 12/2018 | Harada et al. | |
| 2019/0196272 A1* | 6/2019 | Johnson | G02F 1/133603 |

FOREIGN PATENT DOCUMENTS

| | | |
|---|---|---|
| JP | 2008-091114 A | 4/2008 |
| JP | 2010-243982 A | 10/2010 |
| JP | 2011-129277 A | 6/2011 |
| JP | 2012-042783 A | 3/2012 |
| JP | 2012-163785 A | 8/2012 |
| JP | 2013-225058 A | 10/2013 |
| JP | 2016-194552 A | 11/2016 |
| JP | 2008-103200 A | 5/2018 |
| KR | 10-2009-0070828 A | 7/2009 |
| KR | 10-2012-0023184 A | 3/2012 |
| KR | 10-2016-0089706 A | 7/2016 |
| KR | 10-2017-0018327 A | 2/2017 |
| TW | 201109741 A | 3/2011 |
| TW | 201124754 A | 7/2011 |
| WO | 2011/013671 A1 | 2/2011 |
| WO | WO 2017/104677 A1 | 6/2017 |

OTHER PUBLICATIONS

European Search Report for European Patent Application No. 20183636.8, dated Jul. 29, 2020 in 7 pages.

Office Action issued for U.S. Appl. No. 16/927,753, dated Dec. 24, 2020 in 17 pages.

Office Action issued for U.S. Appl. No. 16/927,753, dated Apr. 26, 2021 in 16 pages.

European Office Action issued for European Application No. 19207958.0, dated May 10, 2021 in 5 pages.

\* cited by examiner

MULTILAYER OF LIGHT DIFFUSERS, BACKLIGHT UNIT, AND LIQUID CRYSTAL DISPLAY DEVICE

CROSS-REFERENCE TO RELATED APPLICATION

This application claims priority to Japanese Patent Application No. 2019-45609 filed on Mar. 13, 2019, the entire disclosure of which is incorporated by reference herein.

BACKGROUND ART

The present disclosure relates to a multilayer of light diffusers used for a backlight unit, the backlight unit, and a liquid crystal display device.

In recent years, flat displays such as liquid crystal displays and plasma displays have been widely used for display devices because of their space saving designs and high definition. Among these, liquid crystal displays are drawing attention because of their enhanced power-saving designs and higher definition. Development of liquid crystal displays is thus being progressed.

A liquid crystal display device is a non-light emitting display device including, for example, a liquid crystal display panel and a backlight. The liquid crystal display panel includes a thin film transistor (hereinafter referred to as "TFT") substrate, a color filter (hereinafter referred to as "CF") substrate, and a liquid crystal layer. The TFT substrate faces the CF substrate. The liquid crystal layer is enclosed between the TFT substrate and the CF substrate. The backlight is disposed on the back side of the liquid crystal display panel. In the CF substrate, for example, layers colored in red, green or blue are provided for sub-pixels that form pixels. As the backlight, a backlight unit of a side edge (side light) type or a direct type without any light guide sheet is mounted on the lower surface of the liquid crystal layer. As the direct backlight unit, for example, Japanese Unexamined Patent Publication No. 2011-129277 discloses a backlight unit formed by stacking, for example, light sources, a diffuser sheet, and an optical sheet group, in this order on the back side of a liquid crystal display panel. The optical sheet group includes, for example, a prism sheet facing the light-incident side of the liquid crystal display panel. The light sources are light emitting diodes (LEDs).

SUMMARY OF THE INVENTION

In the backlight unit described in Japanese Unexamined Patent Publication No. 2011-129277, the diffuser sheet is comprised of a transparent resin and transparent fine particles dispersed in the transparent resin. The backlight unit reduces non-uniformity of the luminance of the light emitted from the light sources based on difference in refractive index between the transparent resin and the transparent fine particles. It is however difficult for a direct backlight unit including light sources right below a screen to sufficiently improve the luminance uniformity of the light emitted from the light sources, because there is a great contrast between the regions direct above the light sources and the regions above the spaces between the light sources.

The present disclosure was made in view of the problem. It is an object of the present disclosure to provide light diffusers capable of improving the luminance uniformity of the light emitted from a light source in a direct backlight unit.

In order to achieve the above objective, a multilayer of light diffusers according to the present disclosure includes: the light diffusers layered one on top of another, each of which contains a light diffusing agent in a resin matrix; and an air layer between adjacent ones of the light diffusers.

The present disclosure allows for uniform plane emission of light from the light source in the direct backlight unit, and thus improves the luminance uniformity of the light emitted from the light source.

DESCRIPTION OF EMBODIMENT

First Embodiment

Embodiments of the present disclosure will be described in detail with reference to the drawings.

Figure 1:
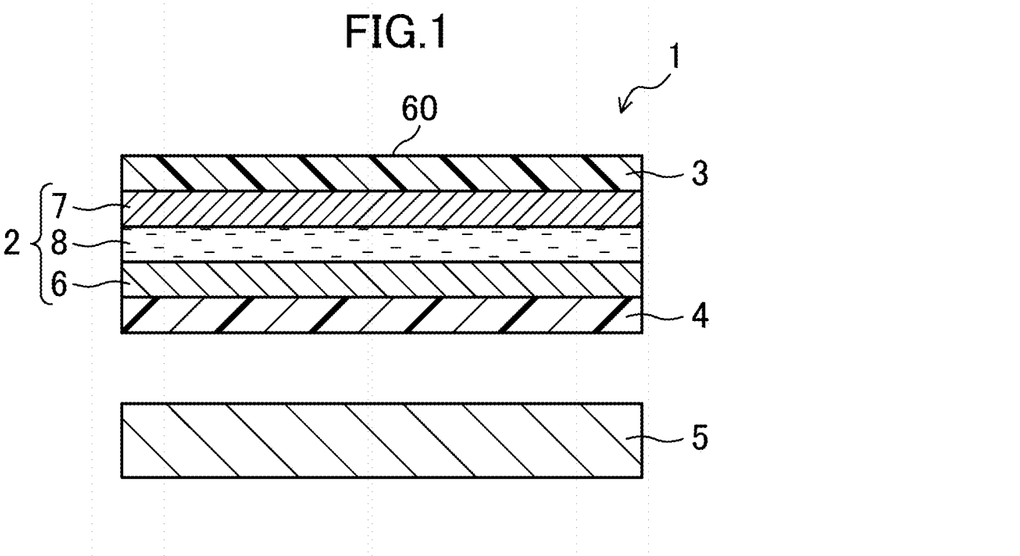
FIG. 1 is a cross-sectional view of a liquid crystal display device according to a first embodiment of the present disclosure.
Figure 2:
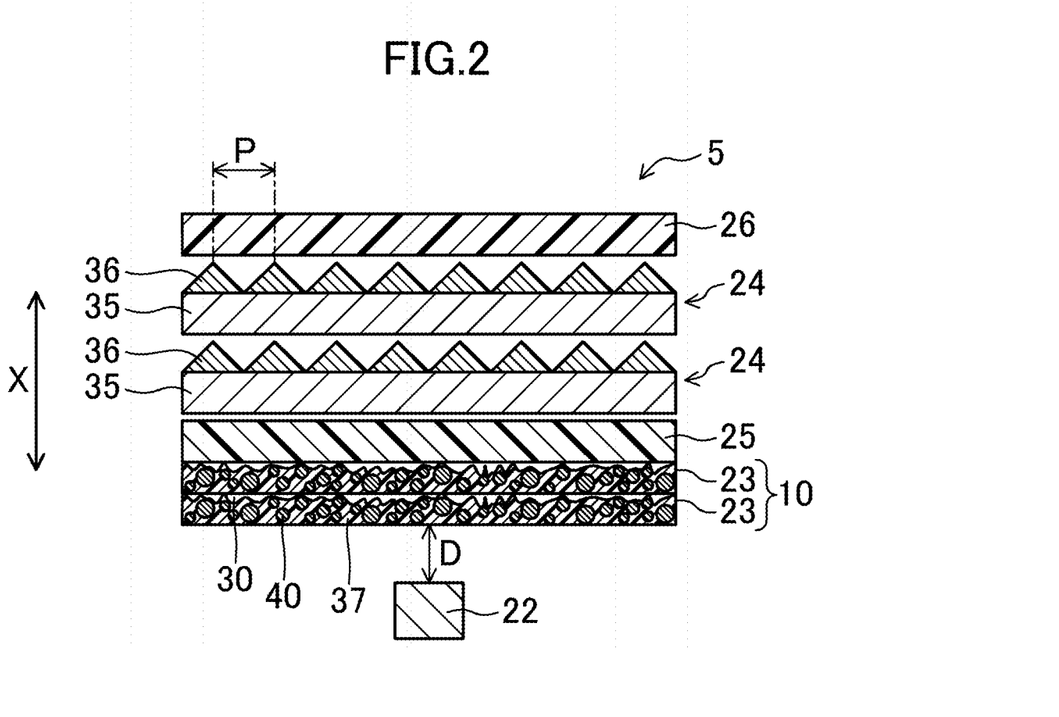
FIG. 2 is a cross-sectional view for illustrating a backlight unit in the liquid crystal display device according to the first embodiment.

FIG. 1 is a cross-sectional view of a liquid crystal display device according to a first embodiment of the present disclosure. FIG. 2 is a cross-sectional view for illustrating a backlight unit in the liquid crystal display device according to the first embodiment.

As shown in FIG. 1, a liquid crystal display device 1 includes a liquid crystal display panel 2, a first polarizer 3 (hereinafter, may also be simply referred to as a "polarizer 3"), a second polarizer 4 (hereinafter, may also be simply referred to as "polarizer 4"), and a backlight unit 5. The liquid crystal display panel 2 includes a plurality of pixels arranged in a matrix. The first polarizer 3 is attached to the front surface of the liquid crystal display panel 2 (i.e., the upper surface in the figure and the viewer-side of the liquid crystal display device 1). The second polarizer 4 is attached to the back (i.e., rear) surface of the liquid crystal display panel 2 (i.e., the lower surface in the figure and the non-viewer-side of the liquid crystal display device 1). The backlight unit 5 is disposed on the back side of the liquid crystal display panel 2.

As shown in FIG. 1, the liquid crystal display panel 2 includes a TFT substrate 6 as a first substrate, a CF substrate 7 as a second substrate, a liquid crystal layer 8, and a sealing member (not shown). The CF substrate 7 faces the TFT substrate 6. The liquid crystal layer 8 is interposed between the TFT substrate 6 and the CF substrate 7. The sealing member is formed in a frame shape to allow the TFT substrate 6 and the CF substrate 7 to adhere to each other and enclose the liquid crystal layer 8 between the TFT substrate 6 and the CF substrate 7.

Each of the TFT substrate 6 and the CF substrate 7 is in the shape of a rectangular plate. The liquid crystal display device 1 includes a plurality of photo spacers (not shown) for regulating the thickness of the liquid crystal layer 8 (i.e., the gap between cells).

The TFT substrate 6 includes, for example, an insulating substrate, a plurality of gate lines, a plurality of source lines, a plurality of TFTs, a protective film, a plurality of pixel electrodes, and an alignment film (not shown). The insulating substrate may be, for example, a glass substrate or a plastic substrate. The gate lines extend parallel to each other on the insulating substrate. The source lines extend parallel to each other, perpendicularly to the gate lines. Each of the TFTs is disposed at one of the intersections between the gate lines and the source lines, that is, for a sub-pixel Pr, Pg, or Pb. The protective film covers the TFTs. The pixel electrodes are arranged in a matrix on the protection film and connected to the TFTs. The alignment film covers the pixel electrodes.

The CF substrate 7 includes an insulating substrate such as a glass substrate or a plastic substrate, a common electrode (not shown) on the insulating substrate, and an alignment film (not shown) to cover the common electrode.

The liquid crystal layer 8 is made of a nematic liquid crystal material with electrooptic properties.

Backlight Unit

As shown in FIG. 2, the backlight unit 5 is a direct backlight unit including a light source 22 on the back side of light diffusers 23. The light source 22 projects rays toward the back surface of the light diffusers 23. The light diffusers 23 collect and diffuse the rays coming from the back side. The backlight unit 5 further includes a quantum dot sheet 25, prism sheets 24, and a reflective polarizer film 26. The quantum dot sheet 25 overlaps the front surface of the light diffuser 23. The prism sheets 24 are disposed on the front side of the quantum dot sheet 25. The reflective polarizer film 26 disposed on the front side of the prism sheets 24.

The "back surface" and "back side" here mean the back surface of the backlight unit 5 opposite to the front surface (or side), where the front surface (or side) is the light-emitting surface (or side) of the backlight unit 5.

Light Source

The light source 22 is disposed on a plane parallel to the light-emitting surface of the backlight unit 5, and emits light toward the light-emitting surface. This embodiment employs a direct light source. As the light source 22, a light emitting diode (LED) can be used, for example. As the light source 22, a plurality of light emitting diodes may be arranged along the back surface of the light diffusers 23.

Light Diffusers

The light diffusers 23 function to diffuse rays incident from the back side and to collect the rays in the normal direction (collect and diffuse) to achieve uniform plane emission of the light coming from the light source 22.

The light diffusers 23 are spaced from the light source 22 at the front side of the light source 22. Each of the light diffusers 23 is formed by dispersing a light diffusing agent 40 in a resin matrix 37 as shown in FIG. 2.

From a need to transmit rays, the resin matrix 37 of each light diffuser 23 is mainly made of a transparent, particularly colorless, and transparent synthetic resin. The main component of the resin matrix 37 is not particularly limited. But examples include polyethylene terephthalate, polyethylene naphthalate, an acrylic resin, aromatic polycarbonate, polystyrene, polyolefin, cellulose acetate, weather-resistant vinyl chloride, and polyimide.

The light diffusing agent 40 of each light diffuser 23 is made of particles with properties diffusing rays, and roughly classified into inorganic fillers and organic fillers. Examples of the inorganic fillers include silica, magnesium silicate, aluminum hydroxide, aluminum oxide, zinc oxide, barium sulfide, and mixtures thereof. Specific examples of the organic fillers include silicone-based diffusing agents such as silicone powder, an acrylic resin, an acrylonitrile resin, polyurethane, polyvinyl chloride, polystyrene, polyamide, and polyacrylonitrile. The silicone-based diffusing agent is made of spherical particles with a siloxane bond. Examples include a silicone resin, silicone rubber, silicone composite powder, which is spherical powder obtained by coating the surface of spherical silicone rubber powder with a silicone resin, and combinations thereof. Among these, silicone composite powder is preferably used.

The shape of the light diffusing agent 40 is not particularly limited. But examples include a sphere, a cube, a needle, a rod, a spindle, a plate, a scale, and fibers. Among these, spherical beads with excellent light diffusibility is preferably used.

If spherical beads are used, the average particle size D50 of the light diffusing agent 40 based on the volume-based particle size distribution preferably falls within a range from 0.8 µm to 30 µm.

Quantum Dot Sheet

The quantum dot sheet 25 functions to convert the light emitted from the light source 22 (e.g., blue light) into light having a wavelength of a certain color (e.g., green or red) as an emission peak wavelength, using quantum dots.

The quantum dot sheet 25 includes a quantum dot layer (not shown) including quantum dots and a binder resin, and a pair of barrier films (both not shown) formed on the light-incident surface and the light-emitting surface of the quantum dot layer.

The quantum dot sheet 25 converts, for example, blue light with a wavelength of 450 nm into green light with a wavelength of 540 nm and red light with a wavelength of 650 nm. Thus, with the use of a light source emitting blue light with a wavelength of 450 nm, the blue light is partially converted into green and red light by the quantum dot sheet 25, and the light transmitted through the quantum dot sheet 25 becomes white light.

Prism Sheet

The prism sheets 24 function to refract rays incident from the back side in the normal direction.

The prism sheets 24 are interposed between the quantum dot sheet 25 and the reflective polarizer film 26 and needs to transmit rays. The main component of the prism sheets 24 is thus a colorless and transparent synthetic resin. Each of the prism sheets 24 includes a base material layer 35 and an array of a plurality of prism projections 36 stacked on the surface of the base material layer 35. The prism projections 36 are layered in a stripe pattern on the surface of the base material layer 35. The prism projections 36 are triangular prisms whose back surfaces are in contact with the surface of associated one of the base material layers 35.

The lower limit of the thickness of each prism sheet 24 (the height from the back surface of the base material layer 35 to the vertices of the prism projections 36) is preferably 35 μm, and more preferably 50 μm. On the other hand, the upper limit of the thickness of each prism sheet 24 is preferably 200 μm, and more preferably 180 μm.

The lower limit of the pitch P (see FIG. 2) of the prism projections 36 of the prism sheets 24 are preferably 12 μm, and more preferably 20 μm. On the other hand, the upper limit of the pitch P of the prism projections 36 of the prism sheets 24 is preferably 100 μm, and more preferably 60 μm.

The vertex angles of the prism projections 36 preferably falls within a range from 85° to 95° The lower limit of the refractive index of the prism projections 36 is preferably 1.5, and more preferably 1.55. On the other hand, the upper limit of the refractive index of the prism projections 36 is preferably 1.7.

While two prism sheets 24 are provided in FIG. 2, the two prism sheets may be bonded into a single prism sheet.

Reflective Polarizer Film

The reflective polarizer film 26 functions to transmit only a first linearly polarized light component (e.g., P-polarized light) of the light emitted from the prism sheets 24, and not to absorb but to reflect a second linearly polarized light component (e.g., S-polarized light) that is orthogonal to the first linearly polarized light component.

The reflected second linearly polarized light component is then reflected again to be depolarized, and in this state, enters the reflective polarizer film 26 again. The reflective polarizer film 26 transmits only the first linearly polarized light component of the incident light, and does not absorb but reflects the second linearly polarized light component that is orthogonal to the first linearly polarized light component.

These steps of the reflective polarizer film 26 are repeated so that the polarization direction of the first linearly polarized light component (i.e., a transmission-axis component) coincides with that of the second linearly polarized light component in the reflective polarizer film 26. Accordingly, all of the light emitted from the backlight unit 5 can be utilized for image formation in the liquid crystal display panel 2.

This reflective polarizer film 26 may be a commercially available film (e.g., product name: DBEF® manufactured by 3M Japan Limited).

As shown in FIG. 2, one of the features of this embodiment is including a multilayer 10 of light diffusers. The multilayer 10 includes two light diffusers 23 layered in the thickness direction X of the backlight unit 5 and an air layer 30 interposed therebetween.

With this structure, the difference in refractive index between the light diffusing agent 40 of the light diffusers 23 and the air layer 30 causes reflection and scattering of light at the interface between the light diffusing agent 40 and the air layer 30. This improves the diffusing performance of the two light diffusers 23 as a whole, thereby allowing uniform plane emission of the light coming from the light source 22. As a result, the luminance uniformity of the light emitted from the light source 22 improves in the direct backlight unit 5.

Here, the distance D between the light source 22 and the multilayer 10 is preferably 10 mm or less in the thickness direction X of the backlight unit 5.

This is because a distance D larger than 10 mm reduces the luminance and increases the thickness of the backlight unit 5 too much, which makes it difficult to achieve reduction in the thickness.

Note that the distance D is preferably 8 mm or less, and more preferably 7 mm or less in view of reducing the thickness of the backlight unit 5 and improving the luminance of light to reduce power consumption.

In addition, the concentration of the light diffusing agent in the light diffuser 23 preferably falls within a range from 0.3% by mass to 8.0% by mass. This is because a low concentration, such as less than 0.3% by mass, may allow the light diffusing agent to exhibit insufficient light diffusing properties, while a concentration larger than 8.0% by mass may cause problems such as reduction in both the luminance and the luminance uniformity.

Second Embodiment

Figure 3:
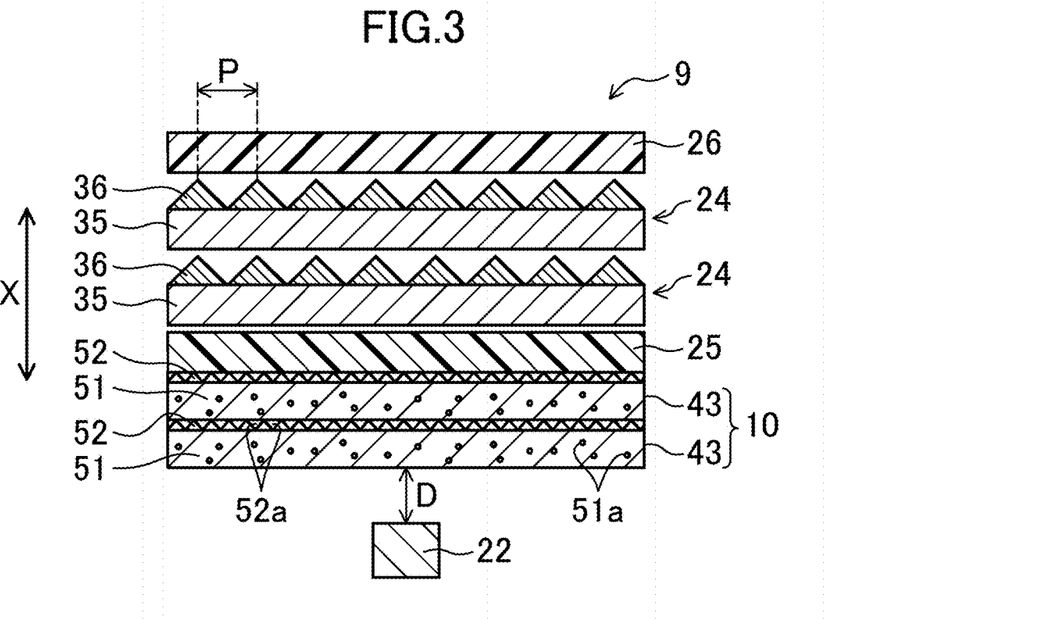
FIG. 3 is a cross-sectional view for illustrating a backlight unit in a liquid crystal display device according to a second embodiment of the present disclosure.
Figure 4:
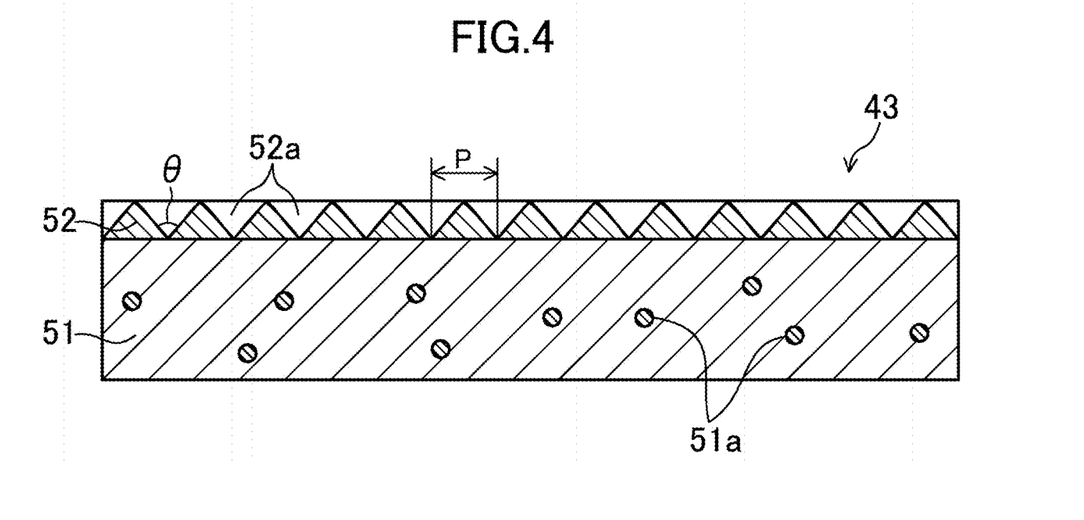
FIG. 4 is a cross-sectional view for illustrating a light diffuser according to the second embodiment.

A second embodiment of the present disclosure will now be described. FIG. 3 is a cross-sectional view for illustrating a backlight unit in a liquid crystal display device according to this embodiment. FIG. 4 is a cross-sectional view for illustrating a light diffuser according to this embodiment. The overall configuration of the liquid crystal display is the same as that in the first embodiment, and detailed description will thus be omitted. The same reference numerals as those in the first embodiment are used to represent equivalent elements, and the detailed explanation thereof will be omitted.

As shown in FIGS. 3 and 4, the light diffusers 23 described above are replaced with light diffusers 43 having surfaces with pyramid shapes in this embodiment.

As shown in FIG. 4, each of the light diffusers 43 includes a resin matrix 51, and an uneven layer 52 on the resin matrix 51. Like the resin matrices 37 described above, each resin matrix 51 contains, for example, polycarbonate as a base material, and a light diffusing agent 51a at a concentration of 0.5% by mass to 4% by mass with respect to 100% by mass of the base material. The light diffusing agent 51a may be made of a known material as appropriate. The uneven layer 52 is made of, for example, clear polycarbonate. On the surface of the uneven layer 52, recesses 52a in inverted pyramid shapes, for example, are arranged two-dimensionally corresponding to the air layer 30 described above. The vertex angles θ of the recesses 52a are 90°, for example. The recesses 52a are arranged at pitch p of about 100 μm for example. The light diffusers 43 may have a single-layer structure containing a light diffusing agent and having an uneven surface. In this manner, the light diffuser(s) 43 is/are not limited to the configuration shown in FIG. 4. For example, the light diffuser(s) may have a single-layer structure with unevenness, or may be a multi-layer of three or more layers including an uneven layer(s). Each uneven layer is formed not only by two-dimensionally arranging the recesses in the inverted pyramid shapes as described above, and may be formed by randomly arranging projections and recesses.

Each light diffuser 43 has at least one surface with unevenness. A total area of some of minute regions, which have surfaces inclined at angles of 30° or more from an imaginary plane of the light diffuser 43 accounts for 30% or more of a total area of the minute regions. The angles are obtained by approximating the surfaces of the minute regions with the unevenness to flat surfaces, while two-dimensionally shifting a minute region with a predetermined projection area with respect to the imaginary plane of the light diffuse 43 along the imaginary plane to obtain the minute regions at respective points on the imaginary plane.

Here, the imaginary plane of the light diffuser 43 means a flat surface of the light diffuser 43, which remains after imaginarily removing the unevenness. More specifically, the "imaginary plane" denotes an imaginary plane provided horizontally in contact the deepest points of the recesses of the unevenness. However, "horizontally" here means being in parallel to the horizontal plane of the light diffuser 43, and does not mean the horizontal direction in a strict sense. For example, if the surface of the light diffuser 43 opposite to the uneven surface is flat or substantially flat, the imaginary plane may be provided in parallel to the opposite surface.

Figure 5A:
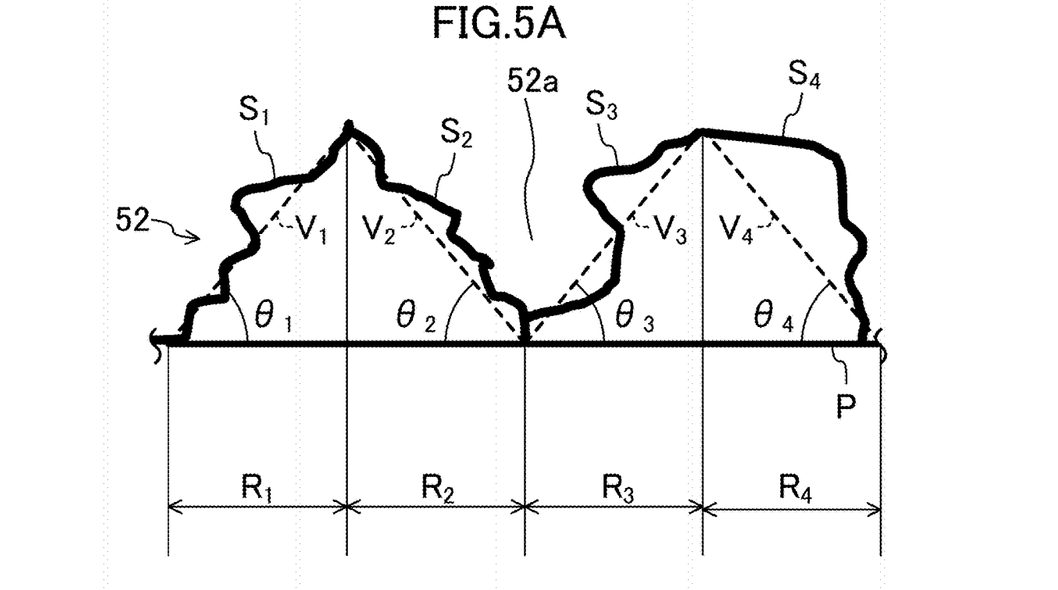
FIG. 5A illustrates an example of obtaining inclination angles of surfaces of minute regions in the light diffuser according to the second embodiment. The inclination angles are obtained by approximating the surfaces of the minute regions with unevenness to flat surfaces, while a minute region with a predetermined projection area is shifted along the imaginary plane.
Figure 5B:
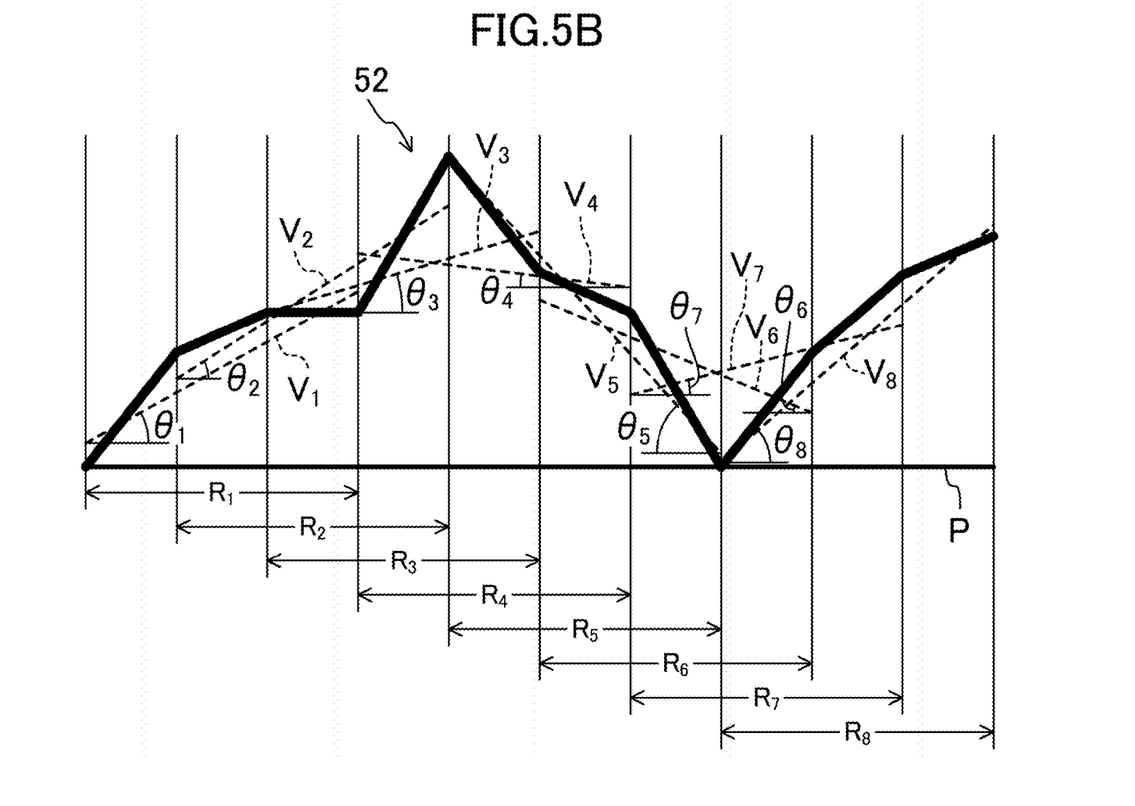
FIG. 5B illustrates another example obtaining inclination angles of surfaces of minute regions in the light diffuser according to the second embodiment. The inclination angles are obtained by approximating the surfaces of the minute regions with unevenness to flat surfaces, while a minute region with a predetermined projection area is shifted along the imaginary plane.

FIG. 5A illustrates an example of obtaining inclination angles (e.g., θ1, θ2, θ3, . . . ) of surfaces (e.g., V1, V2, V3, . . . ) of minute regions (e.g., R1, R2, R3, . . . ) from an imaginary plane (P) of the light diffuser 43 (specifically, the uneven layer 52) in each light diffuser 43. The inclination angles are obtained by approximating the surfaces of the minute regions with unevenness (e.g., S1, S2, S3, . . . ) to flat surfaces, while shifting a minute region with a predetermined projection area along the imaginary plane to obtain the minute regions at respective points on the imaginary plane. In FIG. 5A, the minute region is shifted in accordance with the inclinations of the unevenness for simplification. In practice, however, the minute region is shifted two-dimensionally, regardless of the state of the unevenness as shown in FIG. 5B. At this time, the minute region at the point after the shift may overlap the minute region at the point before the shift.

Figure 6:
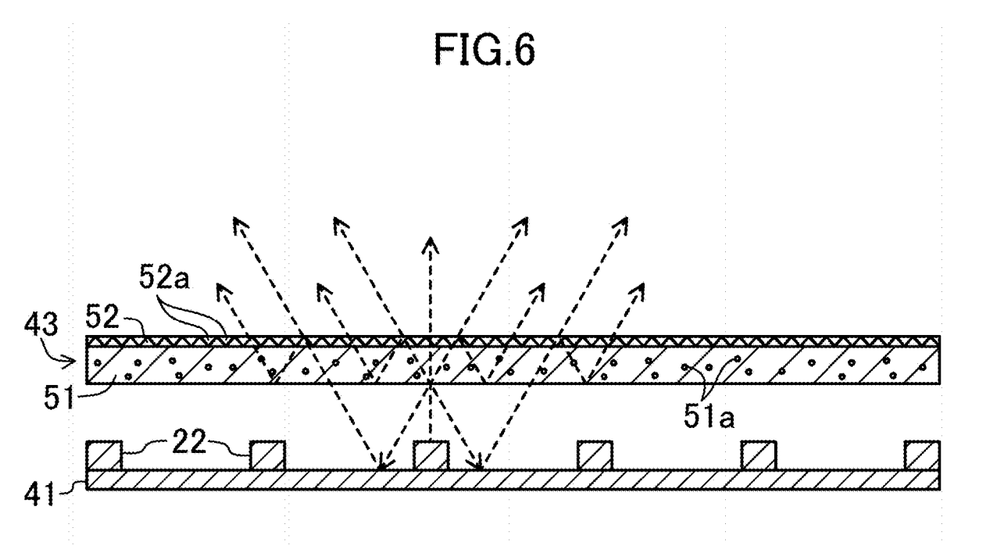
FIG. 6 illustrates that light incident from a light source is reflected by a light diffuser according to the second embodiment.

According to the present embodiment described above, the unevenness is controlled so that the total area of the minute regions with surfaces inclined at angles of 30° or more accounts for 30% or more of the total area of the minute regions. The angles are obtained by approximating the surfaces of the minute regions with the unevenness to flat surfaces, while shifting the minute region with the predetermined projection area with respect to the imaginary plane of the light diffuser 43 along the imaginary plane to obtain the minute regions at respective points on the imaginary plane. As shown in FIG. 6, this control promotes reflection of the light incident on the light diffusers 43 from a plurality of light sources 22 arranged two-dimensionally on a reflection sheet (e.g., a film made of a white polyethylene terephthalate resin or a silver vapor deposition film) 41. Specifically, for example, multiple reflection in the light diffusers 43 and multiple reflection between the reflection sheet 41, on which the light sources 22 are placed, and the light diffuser 43 are promoted. As a result, even if the distance between the light sources 22 and the light diffuser 43 decreases in the direct backlight unit 9 provided with the plurality of light sources 22 such as LEDs, non-uniformity of the luminance between the light sources 22 and the spaces between the light source regions sufficiently decreases in the light emitting surface.

In this embodiment, the number of the light sources 22 is not particularly limited. However, to be distributed, the light sources 22 may be arranged regularly on the reflection sheet 41 in one preferred embodiment. The "arranged regularly" means that arranged with a certain regularity. Examples include the case where the light sources 22 are arranged at equal intervals. If the light sources 22 are arranged at equal intervals, the distance between the centers of two adjacent light sources 22 may fall within a range from 0.5 mm (2 mm in one preferred embodiment) to 20 mm. A distance of 0.5 mm or more between the centers of two adjacent light sources 22 tends to cause a phenomenon (luminance uniformity) that the region between the adjacent light sources 22 has a lower luminance than the other regions. This makes this embodiment more useful.

The shapes of the unevenness of the surface of each light diffuser 43 are not uniform and may be different to some extent (see FIG. 5A), since the processing accuracy is limited in industrial production. In this case, the inclination angles of the surfaces (i.e., the approximated surfaces) of the minute regions on the uneven surface of the light diffuser 43 are different within a range from 0° to 90°. In this embodiment, the unevenness is controlled so that 30 percent of the surfaces have inclinations angles of 30° or more when the differences are aggregated. In particular, light diffusers 43 being plastic films have difficulty in uniformizing the projections or recesses on the surfaces of the light diffusers 43. It is thus largely advantageous to apply this embodiment, which assumes that the inclination angles of the surfaces of the minute regions are different.

While the upper surfaces (i.e., the surfaces closer to the prism sheet 24) of the light diffusers 43 are uneven (i.e. has recesses 52a) in this embodiment, at least one of the surfaces of each light diffuser 43 may be uneven. That is, the lower surface (i.e., the surface closer to the light source 22) or both the surfaces (i.e., the upper and lower surfaces) of each light diffuser 43 may be uneven.

The unevenness of the surfaces of the light diffusers 43 is not particularly limited, as long as the inclination angles from the surfaces of the minute regions are measurable by a method described later. The uneven surface may be, for example, a matte surface with a random pitch, arrangement, or shape. Alternatively, a plurality of projections and recesses may be arranged two-dimensionally.

The unevenness of the surfaces of the light diffusers 43 may include polygonal pyramids or shapes that can be approximated to polygonal pyramids. Here, the "polygonal pyramids" are triangular pyramids, quadrangular pyramids or hexagonal pyramids, which can be arranged tightly on the surfaces of the light diffusers 43 in one preferred embodiment. The tight arrangement of the polygonal pyramids and the shapes that can be approximated to the polygonal pyramids on the surfaces of the light diffusers 43 reduces the total area of the regions inclined at angles of 0° from the imaginary plane of each light diffuser 43. In addition, the surfaces of the light diffusers 43 are formed uneven by a manufacturing process such as extrusion molding or injection molding using a die (e.g., metal rolls). In view of the accuracy in cutting the surface of the die (or each metal roll), the polygonal pyramids may be quadrangular pyramids.

Example of the projections may include hemispheres (i.e., upper halves), cones, triangular pyramids, quadrangular pyramids, and hexagonal pyramids. Example of the recesses may include hemispheres (i.e., lower halves), inverted cones, inverted triangular pyramids, inverted quadrangular pyramids, and inverted hexagonal pyramids.

Example of the projections may further include substantial hemispheres (i.e., upper halves), substantial cones, substantially triangular pyramids, substantially quadrangular pyramids, and substantially hexagonal pyramids. Example of the recesses may further include substantial hemispheres (i.e., lower halves), substantially inverted cones, substantially inverted triangular pyramids, substantially inverted quadrangular pyramids, and substantially inverted hexagonal pyramids. Here, "substantial(ly)" XX means that shapes can be approximated to the XX. For example, "substantially quadrangular pyramids" means shapes can be approximated to the quadrangular pyramids. In fact, the projections and recesses may be deformed from substantial hemispheres (i.e., upper and lower halves), substantially (inverted) cones, substantially (inverted) triangular pyramids, or substantially (inverted) quadrangular pyramids in view of the accuracy in industrial production. There may be inevitable variations in the shapes caused by the processing accuracy of industrial production.

If a plurality of projections and recesses are arranged two-dimensionally on the surfaces of the light diffusers 43, the projections and recesses may be arranged tightly on the entire surfaces of the light diffusers 43. Alternatively, the projections and recesses may be arranged at regular intervals (i.e., a constant pitch) or irregular intervals.

In this embodiment, as long as the inclination angles of the uneven surfaces of the light diffusers 43 can be obtained for each minute region, the method of calculating the inclination angles is not particularly limited. For example, the following method may be employed.

Step 1: With the use of a laser microscope VK-100 manufactured by Keyence Corporation, the surface shapes of the light diffusers 43 are measured at a magnification of 400. Automatic inclination correction is then performed to collect the height data of 1024 pixels horizontally×768 pixels vertically (or 697 μm×522.6 μm) as a comma-separated values (CSV) file. For example, the height may be measured as follows. First, after the point of focus is changed stepwise to obtain a plurality of confocal images to be measured, a variation curve of light intensity (I-Z curve) is estimated for each pixel based on the relationship between the discrete points of focus (Z) and the light detection intensity (I). From the I-Z curve, the peak position, that is, the height is obtained.

Step 2: The height data (digits) collected in Step 1 is converted into height data (μm) using a Z-calibration value.

Step 3: The height data obtained in the Step 2 is used to calculate a plane, to which the surface of a sheet in a minute region of 4×4 pixels (with an area (i.e., the projection area respect to the imaginary plane) of 7.29 μm$^2$) can be approximated, by a known mathematical method based on the data of the minute region.

Step 4: An angle between the approximate plane calculated in Step 3 with the imaginary plane of each light diffuser 43 (i.e., a plane having a height of 0) is calculated to serve the inclination angle of the minute region.

Step 5: Steps 3 and 4 are performed for minute regions at 500,000 or more points (specifically, 779,280 points), while horizontally or vertically shifting the minute region one pixel by one pixel.

Step 6: The percentage of the total area of the minute regions with inclination angles of 30° or more (hereinafter referred to simply as a "percentage of the area with inclination angles of 30° or more") to the total area of the minute regions at the 500,000 or more points measured in Step 5 is calculated.

In one preferred embodiment, the "percentage of the area with inclination angles of 30° or more" is calculated from the height data of the scope (in the range of 522.6 μm×697 μm in Step 1) of 0.5 mm square or more in view of the processing variations as described in Step 1, for example. As a matter of course, the height data may be obtained for a plurality of scopes of 0.5 mm square or more, or for the entire surface of the sheet as a scope to improve the accuracy of the data. With an increase in the scope, the number of the "minute regions" at which the inclination angles are calculated also increases. There is no particular upper limit to the number of the "minute regions," as long as they have no problem as resources for, for example, measurement or data processing. For example, if two scopes of 0.5 mm square or more are set, the number of "minute regions" also doubles. Also, even in the scope of the same size, the number of the "minute regions" increases with an increase in the number of pixels included in the scope. That is, the number of "minute regions" whose inclination angles are to be calculated depends on, for example, the size of the scope, the number of pixels included in the scope, and the areas of the minute regions; which will be described later. However, if the scope has an area of 0.5 mm square or more in view of processing variations, for example, the inclination angles of at least 100,000 or more (preferably 300,000 or more, and more preferably 500,000 or more) minute regions may be calculated to accurately figure out the unevenness.

In the above-described method described above, the inclination angle was calculated, while horizontally or vertically shifting the minute region of 4×4 pixels on a one-pixel basis. Instead, the inclination angle may be calculated, while horizontally or vertically shifting a minute region of the same size on a two-pixel basis. Alternatively, the inclination angle may be calculated, while horizontally or vertically shifting the minute region of a larger size (e.g., 8×8 pixels) on a four-pixel basis. In short, the pixel sizes of the minute regions and the pitch of shifting the minute region can be set freely, as long as unevenness is accurately figured out.

The area (i.e., the projection area respect to the imaginary plane) of the minute region in measuring the inclination angle is not particularly limited, as long as being sufficiently small to evaluate the reflection characteristics of light from a small light source at the micro level. In view of the measurement accuracy and the performance of measurement equipment, the area may be 0.1 mm$^2$ or less (preferably 0.01 mm$^2$ or less, more preferably 0.001 mm$^2$ or less, and further preferably 0.0001 mm$^2$ (i.e., 100 μm$^2$) or less, 7.29 μm$^2$ in Step 3).

In this embodiment, the light diffusers 43 each including the resin matrix 51 with the light diffusing agent 51a promotes light diffusion in the light diffuser 43, thereby further reducing the difference in the luminance between the light sources 22 and the areas between the light sources.

The material of the light diffusing agent 51a contained in the resin matrices 51 is not particularly limited. Examples may include silica, titanium oxide, aluminum hydroxide, and barium sulfate as inorganic particles, as well as acrylic, acrylonitrile, silicone, polystyrene, and polyamide as organic particles.

The particle size of the light diffusing agent 51a may fall within a range from 0.1 μm (preferably 1 μm) to 10 μm (preferably 8 μm), for example, in view of the light diffusing effect.

The concentration of the light diffusing agent 51a may fall within a range from 0.1% (preferably 0.3%) by mass) by mass to 10% (preferably 8%) by mass with respect to 100% by mass of the material (i.e., the matrix) of the resin matrix 51, for example, in view of the light diffusing effect.

The difference in refractive index between the light diffusing agent 51a and the resin matrices 51 may be 0.01 or more, preferably 0.03 or more, more preferably 0.05 or more, further more preferably 0.1 or more, and most preferably 0.15 or more. A difference less than 0.01 between refractive index between the light diffusing agent 51a and the resin matrix 51 causes insufficient diffusion effects of the light diffusing agent 51a.

The main component of the resin matrices 51 is not particularly limited, as long as being a material that transmits light. Examples may include acrylic, polystyrene, polycarbonate, methyl methacrylate-styrene copolymer (an MS resin), polyoxyethylene terephthalate, polyethylene naphthalate, cellulose acetate, and polyimide.

The thickness of the light diffusers 43 of this embodiment is not particularly limited, but may fall, for example, within a range from 0.1 mm to 3 mm (preferably 2 mm, more preferably 1.5 mm, and further more preferably 1 mm). The light diffusers 43 with a thickness larger than 3 mm make it difficult to achieve a reduction in the thickness of the liquid crystal display. On the other hand, the light diffusers 43 with a thickness smaller than 0.1 mm makes it difficult to achieve the effect of improving the luminance uniformity, which has been described above.

If a light diffuser has a multilayer structure (e.g., the resin matrix 51 as the lower layer and the uneven layer 52 as the upper layer) like the light diffusers 43 according to this embodiment, a layer (i.e., the uneven layer 52) with an uneven surface has a thickness that is greater than the maximum height or depth of the unevenness. For example, a layer with projections (or recesses) with a height (or depth) of 20 μm has a thickness larger than 20 μm.

A method of manufacturing the light diffusers 43 is not particularly limited. For example, extrusion molding or injection molding may be employed. Single-layer light diffusers 43 with uneven surfaces may be manufactured by extrusion molding as follows. First, plastic particles as pellets added with a diffusing agent are introduced into a single-screw extruder. The plastic particles may also include those not added with any diffusing agent. The plastic particles are molten and kneaded while being heated. A molten resin extruded through T-dies is then sandwiched between two metal rolls and cooled. After that, the resin is transported by guide rolls to be cut off into sheet plates by a sheet cutter machine, resulting in fabrication of the light-diffusers 43. Here, the molten resin is sandwiched between the metal rolls having surfaces with predetermined inverted unevenness, which will be transferred onto the resin. This allows for shaping of diffuser sheets to have surfaces with the desired unevenness. However, the surface shapes of the rolls are not 100% transferred onto the resin and may thus be counted backwards from the degree of transfer to be designed.

If double-layer light diffusers 43 with uneven surfaces may be manufactured by extrusion molding, for example, plastic particles as pellets necessary for forming each layer are introduced into one of two single-screw extruders. The procedure as above is then performed for each layer. The fabricated sheets are layered.

Alternatively, plastic particles as pellets necessary for forming each layer are introduced into one of two single-screw extruders. The plastic particles are molten and kneaded while being heated. After that, molten resins to be the layers are introduced into a single T-die to be layered therein. The multilayer of the molten resins extruded through the T-die is then sandwiched between two metal rolls and cooled. After that, the multilayer is transported by guide rolls to be cut off into sheet plates using a sheet cutter machine, resulting in fabrication of a double-layer light diffuser 43 with an uneven surface.

In this embodiment, the backlight unit 9 is a direct backlight unit in which a plurality of light sources 22 are distributed on the back side of a display screen 60 of the liquid crystal display device 1. A decrease in the distance between the light sources 22 and the light diffusers 43 is needed to miniaturize the liquid crystal display device 1. However, a decrease in this distance tends to cause the phenomenon that the regions of the display screen 60 above the spaces between the distributed light sources 22 have a lower luminance than the other regions (i.e., non-uniformity of luminance).

By contrast, the light diffusers 43 with uneven surfaces as described above are useful to reduce such non-uniformity of luminance. In particular, the present disclosure is believed to be more useful if the distance between the light sources 22 and the light diffusers 43 is set 15 mm or less, preferably 10 mm or less, more preferably 5 mm or less, further more preferably 2 mm or less, and ultimately 0 mm, aiming to reduce the thickness of small and mid-sized liquid crystal display in the future.

The embodiments described above may be modified as follows.

Figure 7:
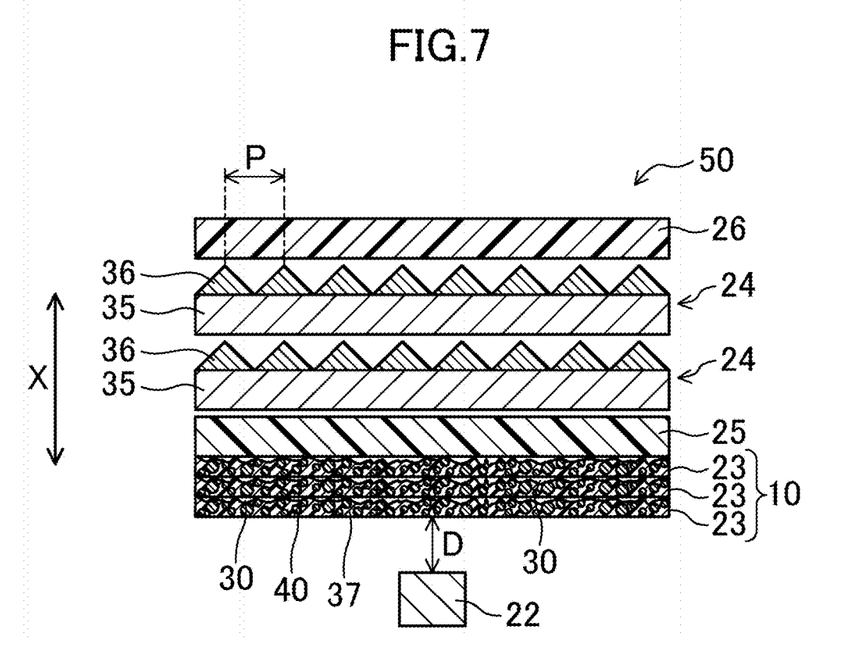
FIG. 7 is a cross-sectional view for illustrating a backlight unit in a liquid crystal display device according to a variation.

In the first embodiment described above, the two diffusers 23 are layered in the thickness direction X of the backlight unit 5. Like a backlight unit 50 shown in FIG. 7, this configuration may be replaced with a multilayer 10 of three layered light diffusers 23. In this case, two air layers 30 are provided, each of which is interposed between adjacent ones of the light diffusers 23, as shown in FIG. 7.

Such a configuration also provides the same or similar advantages to the backlight unit 5 described above.

Alternatively, the reflective polarizer film 26 described above may be interposed between the light source 22 and the multilayer 10 of light diffusers. Such a structure promotes the mixing of light between the light source 22 and the multilayer 10 of light diffusers, without increasing the distance D therebetween to further uniformize a light distribution.

As described above, each of the light diffusers 43 according to the second embodiment includes, on the resin matrix 51, the uneven layer 52 with the uneven surface according to the present disclosure. The light diffusers 43 may be replaced with a single-layer light diffuser 43 containing a diffusing agent and having an uneven surface. Alternatively, three or more light diffusers 43 may be layered, each including a resin matrix 51 and an uneven layer 52. Alternatively, the resin matrix 51 and the uneven layer 52 may be independent light diffusers, which may be layered or independently arranged. In the latter case, the uneven layer 52 may be disposed closer the light source 22. Alternatively, the light diffuser 43 may be comprised only of the resin matrix 51 and the lower surface of the prism sheet 24 may have the unevenness of the present disclosure.

EXAMPLES

The present disclosure will now be described based on examples. The present disclosure is not limited to these examples, and various modifications and variations of these examples can be made without departing from the scope and spirit of the present disclosure.

Example 1

First, the direct backlight unit shown in FIG. 2 was prepared. As a light source, a light-emitting diode (product name: XPGDRY-L1-0000-00501 manufactured by Cree) was used. A multilayer was used which included two layered light diffusers with a thickness of 0.5 mm and an air layer interposed therebetween. Each light diffuser is a mixture of silicone-based fine particles as a light diffusing agent into aromatic polycarbonate. One of the surfaces of the multilayer is matte and the other is a mirror. The matte surface serves as the front surface. In addition, a quantum dot sheet (manufactured by Hitachi Chemical Co., Ltd.) and two prism sheets (product name: BEF-2 manufactured by 3M Japan Limited) were used. The vertexes of the prism array project on the front side. Ridge lines of the prism array are orthogonal to each other. As a reflective polarizer film, a commercially available film (product name: DBEF® manufactured by 3M Japan Limited) was used.

The distance D between the light source and the multilayer of light diffusers was set to 2.0 mm. The concentration of the light diffusion agent in the light diffuser was set to 0.8% by mass, 3.0% by mass, and 8.0% by mass.

Evaluation on Luminance Uniformity

Next, the light-emitting diode was turned on in the prepared backlight unit. The two-dimensional distribution of the luminous intensity was measured using a two-dimensional luminance measurement system (product name: RISA-COLOR/ONE manufactured by HI-LAND). In the obtained two-dimensional distribution (in a plan view) of the luminous intensity, luminance $B_{r=0\ mm}$ at the center indicating the maximum luminance and luminance $B_{r=5\ mm}$ apart from the center at a radius of 5 mm were obtained to calculate the luminance ratio $B_{r=5\ mm}/B_{r=0\ mm}$. A higher luminance ratio $B_{r=5\ mm}/B_{r=0\ mm}$ means a higher diffusivity of the luminance distribution, that is, an improvement in the luminance uniformity of the light emitted from the light source. Table 1 shows the results.

Study on Distance Between Light Source and Multilayer of Light Diffusers

In the backlight unit described above, the distance D between the light source and the multilayer of light diffusers was set to 1.5 mm, 2.0 mm, 2.8 mm, 3.7 mm, 5.0 mm, and 7.0 mm. The concentration of the light diffusion agent in the light diffusers was set to 3.0% by mass.

Then, the luminance uniformity was evaluated as described above, the distance between the light source and the multilayer of light diffusers was studied. Table 2 shows the results.

Example 2

The direct backlight unit shown in FIG. 7 was prepared as in Example 1 except the following. A multilayer was used which included three layered light diffusers and two air layers. Each of the light diffusers are the same as those described above but have a thickness of 0.3 mm. Each of the air layers is interposed between adjacent ones of the light diffusers 23. The concentration of the light diffusion agent in the light diffusers was set to 0.3% by mass, 0.8% by mass, 3.0% by mass, and 8.0% by mass.

Next, the luminance uniformity was evaluated, and the distance between the light source and the multilayer of light diffusers was studied as in Example 1 described above. Tables 1 and 2 show the results.

Comparative Example 1

A direct backlight unit was prepared as in Example 1 except the following. The multilayer of light diffusers described above is replaced with a single light diffuser without any air layer. The light diffuser is the same as those in Example 1 described above but has a thickness of 1.0 mm. The concentration of the light diffusion agent in the light diffuser was set to 0.3% by mass, 0.8% by mass, 3.0% by mass, and 8.0% by mass.

Next, the luminance uniformity was evaluated, and the distance between the light source and the light diffuser was studied as in Example 1 described above. Tables 1 and 2 show the results.

TABLE 1

| Luminance Ratio ($B_{r=5\ mm}/B_{r=0\ mm}$) (Thickness × Number of Diffuser(s)) | Concentration of Diffusing Agent [% by mass] | | | |
|---|---|---|---|---|
| | 0.3 | 0.8 | 3.0 | 8.0 |
| Example 1 (0.5 mm × 2) | — | 0.264 | 0.302 | 0.231 |
| Example 2 (0.3 mm × 3) | 0.192 | 0.273 | 0.296 | 0.215 |
| Comparative Example 1 (1 mm × 1) | 0.187 | 0.260 | 0.231 | 0.128 |

TABLE 2

| Luminance Ratio ($B_{r=5\ mm}/B_{r=0\ mm}$) (Thickness × Number of Diffuser(s)) | Distance D between Light Source and Light Diffuser(s) [mm] | | | | | |
|---|---|---|---|---|---|---|
| | 1.5 | 2.0 | 2.8 | 3.7 | 5.0 | 7.0 |
| Example 1 (0.5 mm × 2) | 0.249 | 0.302 | 0.378 | 0.444 | 0.548 | 0.721 |
| Example 2 (0.3 mm × 3) | 0.249 | 0.296 | 0.382 | 0.435 | 0.547 | 0.718 |
| Comparative Example 1 (1 mm × 1) | 0.188 | 0.231 | 0.319 | 0.404 | 0.519 | 0.715 |

As shown in Table 1, in Examples 1 and 2 including the plurality of (two or three) light diffusers layered along the thickness of the backlight unit and one or more air layers, (each of which) is interposed between adjacent ones of the light diffusers. In these cases, the luminous ratios $B_{r=5\ mm}/B_{r=0\ mm}$ are higher than that in Comparative Example 1 including no air layer. It is found that the diffusivity of the luminance distribution increases, that is, the luminance uniformity of the light emitted from the light source improves.

In particular, in Examples 1 and 2 where the concentrations of the light diffusing agent in the light diffusers fall within a range from 0.3% by mass to 8.0% by mass, it is found that the luminance uniformity of the light emitted from the light source improves as compared to Comparative Example 1.

As shown in Table 2, in Examples 1 and 2 where the distances D between the light source and the light diffusers are 7 mm or less, the luminance ratios $B_{r=5\ mm}/B_{r=0\ mm}$ are higher than that in Comparative Example 1. It is found that the diffusivity of the luminance distribution increases, that is, the luminance uniformity of the light emitted from the light source improves.

Next, the present disclosure using light diffusers with pyramid shapes will be described based on the examples.

The steps 1 to 6 described above were used to calculate the inclination angles of the uneven surfaces of the light diffusers in the examples, and to calculate the "ratio of the area with inclination angles of 30° or more" of the light diffusers in the examples.

Figure 8:
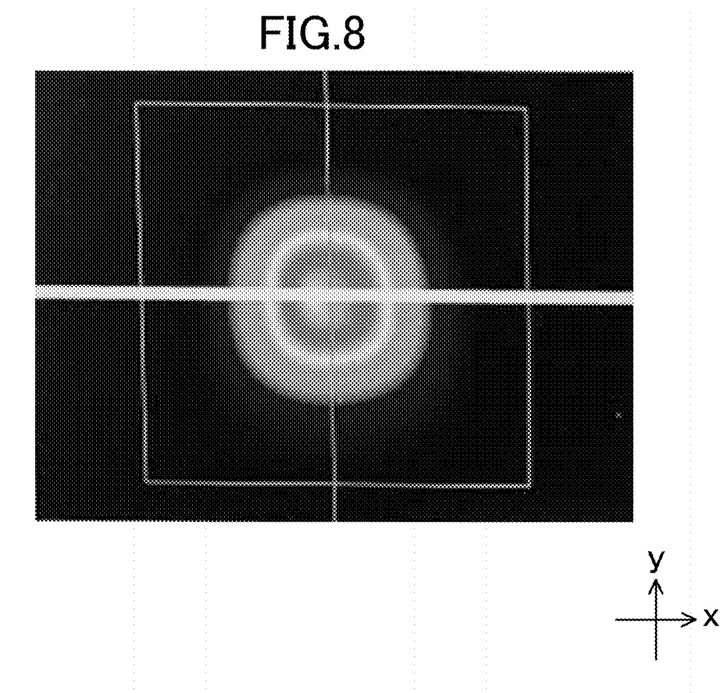
FIG. 8 illustrates a luminance distribution at a light source.
Figure 9:
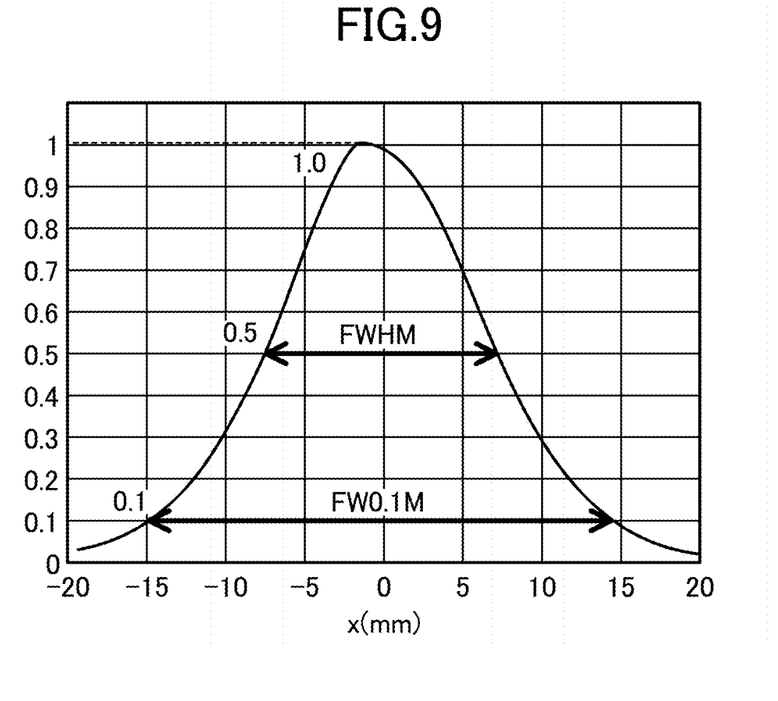
FIG. 9 illustrates a distribution in the x direction of the luminance distribution shown in FIG. 8.

The luminance uniformity was evaluated as follows in each example to provide universal evaluation considering the influence of the light-emitting characteristics of LEDs used as light sources and the arrangement of LEDs. First, after one LED had been turned on, the luminance of the LED image on the two-dimensional plane was measured from the upper side of a polarizer sheet (e.g., DBEF series manufactured by 3M) to obtain variations in the luminance according to the distance from the center of the LED. At that time, the light diffuser(s) to be evaluated was/were disposed at a certain distance from the LED, two prism sheets were layered with their ridge lines orthogonal to each other, and the polarizer sheet was disposed on the prism sheets. FIG. 8 shows a two-dimensional luminance distribution of an LED image obtained by the two-dimensional luminance measurement described above using RISACOLOR manufactured by HI-LAND. Next, a luminance variation curve was extracted along a straight line (i.e., a white line extending along the x-axis in FIG. 8) passing through the central point of the LED to form a graph with the horizontal axis representing the distance from the center of the LED and the vertical axis representing a relative luminance to the maximum luminance of 1, as shown in FIG. 9. The width of the graph along the horizontal axis was obtained at the relative luminance of 0.5, as the full width at half maximum (FWHM). A larger FWHM means a wide spread of light and an improved luminance uniformity. The FWHM was thus used to evaluate the luminance uniformity in each of the examples.

In each example, the base resin (i.e., the matrix) of the light diffuser(s) is/are made of polycarbonate with a refractive index of 1.59, whereas the diffusing agent added to the base resin is made of silicone with a refractive index 1.43. That is, the difference in refractive index between the base resin and the diffusing agent is 0.16 in the light diffuser(s) of each example.

Example 3

Light diffusers according to Example 3 were each fabricated by the following method. First, the base resin and the diffusing agent resin were mixed and subjected to extrusion molding to be a resin film. Two metal rolls were then pressed onto the resin film to transfer the surface shapes of the rolls onto the surfaces of the resin film. One of the rolls has a random matte surface with Ra of 4.5 μm, whereas the other has a surface with pyramid shapes. As a result, single-layer light diffusers were fabricated, each of which had a thickness of 0.15 mm, a random (embossed) matte surface on one side, and a surface recessed in pyramid shapes on the other.

The surface shapes of the light diffusers according to Example 3 fabricated in this manner are shown in Table 3. In the light diffusers according to Example 3, the "ratio of the area with inclination angles of 30° or more" of the surface recessed in the pyramid shapes was 90%.

Next, the direct backlight unit shown in FIG. 3 was prepared. As a light source, a light-emitting diode (product name: XPGDRY-L1-0000-00501 manufactured by Cree) was used. A multilayer was used which included two layered light diffusers and an air layer interposed therebetween. As shown in Table 3, the surface recessed in the pyramid shapes serves as the front surface. In addition, a quantum dot sheet (manufactured by Hitachi Chemical Co., Ltd.) and two prism sheets (product name: BEF-2, manufactured by 3M Japan Limited) were used. The vertexes of the prism array project at the front surface. Ridge lines of the prism array are orthogonal to each other. As a reflective polarizer film, a commercially available film (product name: DBEF® manufactured by 3M Japan Limited) was used.

The distance D between the light source and the multilayer of light diffusers was set to 1.0 mm and 2.0 mm. The FWHM was then measured to evaluate the luminance uniformity by the method described above. Table 3 shows the results.

Example 4

The orientations of the light diffusers each fabricated in Example 3 were changed to those shown in Table 3. Otherwise, the FWHMs were measured as in Example 3 described above to evaluate the luminance uniformity. Table 3 shows the results.

Example 5

The orientations of the light diffusers each fabricated in Example 3 were changed to those shown in Table 3. Otherwise, the FWHMs were measured as in Example 3 described above to evaluate the luminance uniformity. Table 3 shows the results.

Comparative Example 3

A light diffuser according to Comparative Example 3 was fabricated by the following method. First, the base resin and the diffusing agent resin were mixed and subjected to extrusion molding to be a resin film. Two metal rolls were then pressed onto the resin film to transfer the surface shapes of the rolls onto the surfaces of the resin film. One of the rolls has a random matte surface with Ra of 4.5 μm. whereas the other has a mirror surface. As a result, a single-layer light diffuser was fabricated which had a thickness of 0.3 mm, a random matte surface on one side, and a mirror surface on the other.

The surface shapes of the light diffuser according to Comparative Example 3 fabricated in this manner are shown in Table 3. In the light diffuser according to Comparative Example 3, the "ratio of the area with inclination angles of 30° or more" of the surface recessed in pyramid shapes was 25%.

The light diffusers fabricated in Example 3 were replaced with the single light diffuser in this Comparison Example, which was oriented as shown in Table 3. Otherwise, the FWHMs were measured as in Example 3 described above to evaluate the luminance uniformity. Table 3 shows the results.

Comparative Example 4

The orientation of the light diffuser fabricated in Comparative Example 3 was changed to that shown in Table 3. Otherwise, the FWHMs were measured as in Comparative Example 3 described above to evaluate the luminance uniformity. Table 3 shows the results.

Comparative Example 5

Light diffusers according to Comparative Example 5 were each fabricated by the following method. First, the base resin and the diffusing agent resin were mixed and subjected to extrusion molding to be a resin film. Two metal rolls were then pressed onto the resin film to transfer the surface shapes of the rolls onto the surfaces of the resin film. One of the rolls has a random matte surface with Ra of 4.5 μm, whereas the other has a mirror surface. As a result, single-layer light diffusers were fabricated, each of which had a thickness of 0.1 mm, a random matte surface on one side, and a mirror surface on the other on the other.

The surface shapes of the light diffusers according to Comparative Example 5 fabricated in this manner are shown in Table 3. In the light diffusers according to Comparative Example 5, the "ratio of the area with inclination angles of 30° or more" of the surface recessed in pyramid shapes was 25%.

The light diffusers fabricated in Example 3 were replaced with three light diffusers in this Comparison Example, which were oriented as shown in Table 3. Otherwise, the FWHMs were measured as in Example 3 described above to evaluate the luminance uniformity. Table 3 shows the results.

Comparative Example 6

The orientations of the light diffusers fabricated in Comparative Example 5 were changed to those shown in Table 3. Otherwise, the FWHMs were measured as in Comparative Example 5 described above to evaluate the luminance uniformity. Table 3 shows the results.

Comparative Example 7

Light diffusers according to Comparative Example 7 were each fabricated by the following method. First, the base resin and the diffusing agent resin were mixed and subjected to extrusion molding to be a resin film. Two metal rolls were then pressed onto the resin film to transfer the surface shapes of the rolls onto the surfaces of the resin film. One of the rolls has a random matte surface with Ra of 4.5 μm, whereas the other has a mirror surface. As a result, single-layer light diffusers were fabricated, which of which had a thickness of 0.15 mm, a random matte surface on one side, and a mirror surface on the other on the other.

The surface shapes of the light diffusers according to Comparative Example 7 fabricated in this manner are shown in Table 3. In the light diffusers according to Comparative Example 7, the "ratio of the area with inclination angles of 30° or more" of the surface recessed in pyramid shapes was 25%.

The light diffusers fabricated in Example 3 were replaced with two light diffusers in this Comparison Example, which were oriented as shown in Table 3. Otherwise, the FWHMs were measured as in Example 3 described above to evaluate the luminance uniformity. Table 3 shows the results.

Comparative Example 8

The orientations of the light diffusers fabricated in Comparative Example 7 were changed to those shown in Table 3. Otherwise, the FWHMs were measured as in Comparative Example 7 described above to evaluate the luminance uniformity. Table 3 shows the results.

TABLE 3

| FWHM (mm) (Thickness × Number of Diffuser(s)) | Surface Shapes and Orientation(s) of Diffuser(s)* | Distance D between Light Source and Light Diffuser(s) [mm] | |
|---|---|---|---|
| | | 1.0 | 2.0 |
| Example 3 (0.15 mm × 2) | Two embossed mattes, with pyramid shapes attached to one side of each matte. The mattes are stacked such that both pyramid shape sides are pointed down. | 7.41 | 9.50 |
| Example 4 (0.15 mm × 2) | Two embossed mattes, with pyramid shapes attached to one side of each matte. The mattes are stacked such that both pyramid shape sides are pointed up. | 7.11 | 9.70 |
| Example 5 (0.15 mm × 2) | Two embossed mattes, with pyramid shapes attached to one side of each matte. The mattes are stacked such that the bottom pyramid shape side is pointed down, and the top pyramid shape side is pointed up. | 7.26 | 9.52 |
| Comparative Example 3 (0.3 mm × 1) | An embossed matte with a mirror on the top end. | 6.70 | 9.22 |
| Comparative Example 4 (0.3 mm × 1) | An embossed matte with a mirror on the bottom end. | 6.64 | 8.96 |
| Comparative Example 5 (0.1 mm × 3) | Three stacked embossed mattes with a mirror on one end of each matte. The mattes are stacked such that the minor end is facing up for all three mattes. | 6.90 | 9.39 |
| Comparative Example 6 (0.1 mm × 3) | Three stacked embossed mattes with a minor on one end of each matte. The mattes are stacked such that the minor end is facing down for all three mattes. | 6.87 | 9.08 |
| Comparative Example 7 (0.15 mm × 2) | Two stacked embossed mattes with a mirror on one end of each matte. The mattes are stacked such that the mirror end is facing up for both mattes. | 6.75 | 9.25 |
| Comparative Example 8 (0.15 mm × 2) | Two stacked embossed mattes with a mirror on one end of each matte. The mattes are stacked such that the mirror end is facing down for both mattes. | 6.92 | 9.35 |

*(Lower Surface: Light-Incident Side, Upper Surface: Light-Emitting Side)

Diffusers of Embodiments 3 to 5 with One Surface Embossed and The Other with Pyramid Shapes
Diffuser(s) of Comparative Embodiments 3 to 8 with One Surface Embossed and The Other Mirror As shown in Table 3, in Examples 3 to 5 including the plurality of (two) light diffusers layered along the thickness of the backlight unit and one air layer interposed therebetween, the FWHMs are greater than those in Comparative Examples 3 to 8 including no uneven surface with inverted pyramids. It is found that the diffusivity of the luminance distribution increases, that is, the luminance uniformity of the light emitted from the light source improves.

Example 6

The direct backlight unit shown in FIG. 7 was prepared as in Example 1 except the following. A multilayer with a total thickness of 0.5 mm was used which included three layered light diffusers and two air layers each interposed between adjacent ones of the light diffusers. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.2 mm and contains 3.0% by mass of a diffusing agent with respect to the total mass of the light diffuser. The other two have a thickness of 0.15 mm and contains 0.8% by mass of a diffusing agent with respect to the total mass of the light diffusers. The two light diffusers with the thickness of 0.15 mm were arranged on the front side, whereas the light diffuser with the thickness of 0.2 mm was on the back side.

Next, the luminance uniformity was evaluated as in Example 1 described above. Table 4 shows the results.

Example 7

The direct backlight unit shown in FIG. 2 was prepared as in Example 1 except the following. A multilayer with a total thickness of 0.35 mm was used which included two layered light diffusers and an air layer interposed therebetween. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.2 mm and contains 3.0% by mass of a diffusing agent with respect to the total mass of the light diffuser. The other has a thickness of 0.15 mm and contains 0.8% by mass of a diffusing agent with respect to the total mass of the light diffusers. The light diffuser with the thickness of 0.15 mm was arranged on the front side, whereas the light diffuser with the thickness of 0.2 mm was on the back side.

Next, the luminance uniformity was evaluated as in Example 1 described above. Table 4 shows the results.

Example 8

The direct backlight unit shown in FIG. 2 was prepared as in Example 1 except the following. A multilayer with a total thickness of 0.2 mm was used which included two layered light diffusers and an air layer interposed therebetween. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.1 mm and contains 3.0% by mass of a diffusing agent with respect to the total mass of the light diffuser. The other has a thickness of 0.1 mm and contains 0.8% by mass of a diffusing agent with respect to the total mass of the light diffusers. The light diffuser with the thickness of 0.1 mm and the concentration of 0.8% by mass was arranged on the front side, whereas the light diffuser with the thickness of 0.1 mm and the concentration of 3.0% by mass on the back side.

Next, the luminance uniformity was evaluated as in Example 1 described above. Table 4 shows the results.

Example 9

The direct backlight unit shown in FIG. 2 was prepared as in Example 1 except the following. A multilayer with a total thickness of 0.15 mm was used which included two layered light diffusers and an air layer interposed therebetween. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.1 mm and contains 3.0% by mass of a diffusing agent with respect to the total mass of the light diffuser. The other has a thickness of 0.05 mm and contains 0.8% by mass of a diffusing agent with respect to the total mass of the light diffusers. The light diffuser with the thickness of 0.05 mm was arranged on the front side, whereas the light diffuser with the thickness of 0.1 mm was on the back side.

Next, the luminance uniformity was evaluated as in Example 1 described above. Table 4 shows the results.

Example 10

The direct backlight unit shown in FIG. 7 was prepared as in Example 1 except the following. A multilayer with a total thickness of 0.15 mm was used which included three layered light diffusers and two air layers each interposed between adjacent ones of the light diffusers. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.05 mm and contains 3.0% by mass of a diffusing agent with respect to the total mass of the light diffuser. The other two have a thickness of 0.05 mm and contains 0.8% by mass of a diffusing agent with respect to the total mass of the light diffusers. The two light diffusers with the thickness of 0.05 mm and the concentration of 0.8% by mass was arranged on the front side, whereas the light diffuser with the thickness of 0.05 mm and the concentration of 3.0% by mass was on the back side.

Next, the luminance uniformity was evaluated as in Example 1 described above. Table 4 shows the results.

Example 11

The direct backlight unit shown in FIG. 2 was prepared as in Example 1 except the following. A multilayer with a total thickness of 0.1 mm was used which included two layered light diffusers and an air layer interposed therebetween. Each light diffuser is a mixture of silicone-based fine particles as a light diffusing agent into aromatic polycarbonate. One surface of the multilayer is matte and the other is a mirror. The matte surface serves as the front surface. One light diffuser has a thickness of 0.05 mm and contains 3.0% by mass of a diffusing agent with respect to the total mass of the light diffuser. The other has a thickness of 0.05 mm and contains 0.8% by mass of a diffusing agent with respect to the total mass of the light diffusers. The light diffuser with the thickness of 0.05 mm and the concentration of 0.8% by mass was arranged on the front side, whereas the light diffuser with the thickness of 0.05 mm and the concentration of 3.0% by mass was on the back side.

Next, the luminance uniformity was evaluated as in Example 1 described above. Table 4 shows the results.

Comparative Example 9

A direct backlight unit was prepared as in Example 1 except the following. The multilayer of light diffusers described above was replaced with only a single light diffuser without any air layer. The light diffuser is a mixture of silicone-based fine particles as a light diffusing agent into aromatic polycarbonate. One surface of the light diffuser is matte and the other is a mirror. The matte surface serves as the front surface. The light diffuser has a thickness of 0.5 mm and contains 0.8% by mass of a diffusing agent with respect to the total mass of the light diffuser.

Next, the luminance uniformity was evaluated as in Example 1 described above. Table 5 shows the results.

Comparative Example 10

A direct backlight unit was prepared as in Comparative Example 9 except that the concentration of the diffusing agent with respect to the total mass of the light diffuser was changed to 3.0% by mass.

Next, the luminance uniformity was evaluated as in Example 1 described above. Table 5 shows the results.

Comparative Example 11

A direct backlight unit was prepared as in Example 1 except the following. The multilayer of light diffusers described above was replaced with only a single light diffuser without any air layer. The light diffuser is a mixture of silicone-based fine particles as a light diffusing agent into aromatic polycarbonate. One surface of the light diffuser is matte and the other is a mirror. The matte surface serves as the front surface. The light diffuser has a thickness of 0.35 mm and contains 0.8% by mass of a diffusing agent with respect to the total mass of the light diffuser.

Next, the luminance uniformity was evaluated as in Example 1 described above. Table 5 shows the results.

Comparative Example 12

A direct backlight unit was prepared as in Comparative Example 11 except that the concentration of the diffusing agent with respect to the total mass of the light diffuser was changed to 3.0% by mass.

Next, the luminance uniformity was evaluated as in Example 1 described above. Table 5 shows the results.

Comparative Example 13

A direct backlight unit was prepared as in Example 1 except the following. The multilayer of light diffusers described above was replaced with only a single light diffuser without any air layer. The light diffuser is a mixture of silicone-based fine particles as a light diffusing agent into aromatic polycarbonate. One surface of the light diffuser is matte and the other is a mirror. The matte surface serves as the front surface. The light diffuser has a thickness of 0.2 mm and contains 0.8% by mass of a diffusing agent with respect to the total mass of the light diffuser.

Next, the luminance uniformity was evaluated as in Example 1 described above. Table 5 shows the results.

Comparative Example 14

A direct backlight unit was prepared as in Comparative Example 13 except that the concentration of the diffusing agent with respect to the total mass of the light diffuser was changed to 3.0% by mass.

Next, the luminance uniformity was evaluated as in Example 1 described above. Table 5 shows the results.

Comparative Example 15

A direct backlight unit was prepared as in Example 1 except the following. The multilayer of light diffusers described above was replaced with only a single light diffuser without any air layer. The light diffuser is a mixture of silicone-based fine particles as a light diffusing agent into aromatic polycarbonate. One surface of the light diffuser is matte and the other is a mirror. The matte surface serves as the front surface. The light diffuser has a thickness of 0.15 mm and contains 0.8% by mass of a diffusing agent with respect to the total mass of the light diffuser.

Next, the luminance uniformity was evaluated as in Example 1 described above. Table 5 shows the results.

Comparative Example 16

A direct backlight unit was prepared as in Comparative Example 15 except that the concentration of the diffusing agent with respect to the total mass of the light diffuser was changed to 3.0% by mass.

Next, the luminance uniformity was evaluated as in Example 1 described above. Table 5 shows the results.

Comparative Example 17

A direct backlight unit was prepared as in Example 1 except the following. The multilayer of light diffusers described above was replaced with only a single light diffuser without any air layer. The light diffuser is a mixture of silicone-based fine particles as a light diffusing agent into aromatic polycarbonate. One surface of the light diffuser is matte and the other is a mirror. The matte surface serves as the front surface. The light diffuser has a thickness of 0.1 mm and contains 0.8% by mass of a diffusing agent with respect to the total mass of the light diffuser.

Next, the luminance uniformity was evaluated as in Example 1 described above. Table 5 shows the results.

Comparative Example 18

A direct backlight unit was prepared as in Comparative Example 17 except that the concentration of the diffusing agent in the light diffuser was changed to 3.0% by mass.

Next, the luminance uniformity was evaluated as in Example 1 described above. Table 5 shows the results.

TABLE 4

| (Thickness × Number of Diffuser(s)) | Total Thickness [mm] | Luminance Ratio ($B_{r-5mm}/B_{r-0mm}$) |
|---|---|---|
| Example 6 (0.2 mm × 1 + 0.15 mm × 2) | 0.5 | 0.235 |
| Example 7 (0.2 mm × 1 + 0.15 mm × 1) | 0.35 | 0.212 |
| Example 8 (0.1 mm × 2) | 0.2 | 0.191 |
| Example 9 (0.1 mm × 1 + 0.05 mm × 1) | 0.15 | 0.185 |
| Example 10 (0.05 mm × 3) | 0.15 | 0.189 |
| Example 11 (0.05 mm × 2) | 0.1 | 0.184 |

TABLE 5

| (Thickness × Number of Diffuser(s), Amount of Diffusing Agent) | Total Thickness [mm] | Luminance Ratio ($B_{r-5mm}/B_{r-0mm}$) |
|---|---|---|
| Comparative Example 9 (0.5 mm × 1, 0.8% by mass) | 0.5 | 0.228 |
| Comparative Example 10 (0.5 mm × 1, 3.0% by mass) | 0.5 | 0.218 |
| Comparative Example 11 (0.35 mm × 1, 0.8% by mass) | 0.35 | 0.205 |

TABLE 5-continued

| (Thickness × Number of Diffuser(s), Amount of Diffusing Agent) | Total Thickness [mm] | Luminance Ratio ($B_{r\,=\,5\,mm}/B_{r\,=\,0\,mm}$) |
|---|---|---|
| Comparative Example 12 (0.35 mm × 1, 3.0% by mass) | 0.35 | 0.185 |
| Comparative Example 13 (0.2 mm × 1, 0.8% by mass) | 0.2 | 0.186 |
| Comparative Example 14 (0.2 mm × 1, 3.0% by mass) | 0.2 | 0.147 |
| Comparative Example 15 (0.15 mm × 1, 0.8% by mass) | 0.15 | 0.182 |
| Comparative Example 16 (0.15 mm × 1, 3.0% by mass) | 0.15 | 0.142 |
| Comparative Example 17 (0.1 mm × 1, 0.8% by mass) | 0.1 | 0.178 |
| Comparative Example 18 (0.1 mm × 1, 3.0% by mass) | 0.1 | 0.140 |

As shown in Tables 4 and 5, in Examples 6 including the plurality of (three) light diffusers layered along the thickness of the backlight unit and air layers each interposed between adjacent ones of the light diffusers. In these cases, the luminous ratio $B_{r=5\,mm}/B_{r=0\,mm}$ is higher than those in Comparative Examples 9 and 10 including no air layer, although the total thicknesses are all 0.5 mm. It is found that the diffusivity of the luminance distribution increases, that is, the luminance uniformity of the light emitted from the light source improves.

Likewise, the following is found in comparison between Example 7 and Comparative Examples 11 to 12 where the total thicknesses are all 0.35 mm, between Example 8 and Comparative Examples 13 to 14 where the total thicknesses are all 0.2 mm, between Examples 9 to 10 and Comparative Examples 15 to 16 where the total thicknesses are all 0.15 mm, and between Example 11 and Comparative Examples 17 to 18 where the total thicknesses are all 0.1 mm. In Examples 7 to 11 including the plurality of (two or three) layered light diffusers and one or more air layers, (each of which) is interposed between adjacent ones of the light diffusers, the diffusivity of the luminance distribution increases, that is, the luminance uniformity of the light emitted from the light source improves.

As described above, the present disclosure is particularly useful as a multilayer of light diffusers applied to a liquid crystal display device.

What is claimed is:

1. A backlight unit, comprising:
a light source that is a point light source;
a multilayer of light diffusers layered one on top of another, and provided at a front side of the light source, apart from the light source, each of which contains a light diffusing agent in a resin matrix, a surface of the multilayer being configured to emit light coming from the light source; and
an air layer between adjacent ones of the light diffusers, wherein the backlight unit is a direct backlight unit with the light source disposed on a back of the light diffusers,
each light diffuser has at least one surface with unevenness, and the multilayer of light diffusers is configured such that the unevenness is disposed between adjacent ones of the light diffusers,
the unevenness has a shape of polygonal pyramids that are arranged tightly on the surface of the light diffusers, and
the multilayer is apart from the light source at a distance of 2.8 mm or less.

2. The backlight unit of claim 1, wherein the number of the light diffusers is two or three.

3. The backlight unit of claim 1, wherein a concentration of the light diffusing agent in each of the light diffusers falls within a range from 0.3% by mass to 8.0% by mass.

4. The backlight unit of claim 1, wherein an average particle size of the light diffusing agent contained in the resin matrix in each of the light diffusers falls within a range from 0.8 μm to 30 μm.

5. The backlight unit of claim 1, wherein
the resin matrix is an aromatic polycarbonate, and
the light diffusing agent is a silicone-based diffusing agent.

6. The backlight unit of claim 1, wherein
in each of the light diffusers, a total area of some of minute regions, which have surfaces inclined at angles of 30° or more from an imaginary plane that is a flat surface appearing after imaginarily removing the unevenness, accounts for 30% or more of a total area of the minute regions, where the angles are obtained by approximating the surfaces of the minute regions with the unevenness to flat surfaces, while two-dimensionally shifting the minute region with a predetermined projection area with respect to the imaginary plane along the imaginary plane to obtain the minute regions at respective points on the imaginary plane.

7. The backlight unit of claim 1, wherein a prism sheet is disposed on a front side of the multilayer.

8. The backlight unit of claim 7, wherein a quantum dot sheet is interposed between the multilayer and the prism sheet.

9. A liquid crystal display device, comprising:
a liquid crystal display panel; and
the backlight unit of claim 1 at a back side of the liquid crystal display panel.

* * * * *

UNITED STATES PATENT AND TRADEMARK OFFICE
CERTIFICATE OF CORRECTION

PATENT NO. : 11,143,914 B2  
APPLICATION NO. : 16/698259  
DATED : October 12, 2021  
INVENTOR(S) : Chengheng Tsai et al.

Page 1 of 1

It is certified that error appears in the above-identified patent and that said Letters Patent is hereby corrected as shown below:

In the Specification

In Column 10, Line 54, after "0.3%)" delete "by mass)".

In Column 11, Line 35, delete "light-diffusers" and insert --light diffusers--.

In Column 16, Line 18 (Approx.), delete "µm." and insert --µm,--.

In Columns 17-18, Line 33 (Approx.), table 3, delete "minor" and insert --mirror--.

In Columns 17-18, Line 35 (Approx.), table 3, delete "minor" and insert --mirror--.

In Columns 17-18, Line 36 (Approx.), table 3, delete "minor" and insert --mirror--.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*